Dec. 13, 1932.  H. KUNARD  1,890,515
AUTO RIM
Filed May 27, 1932   2 Sheets-Sheet 1
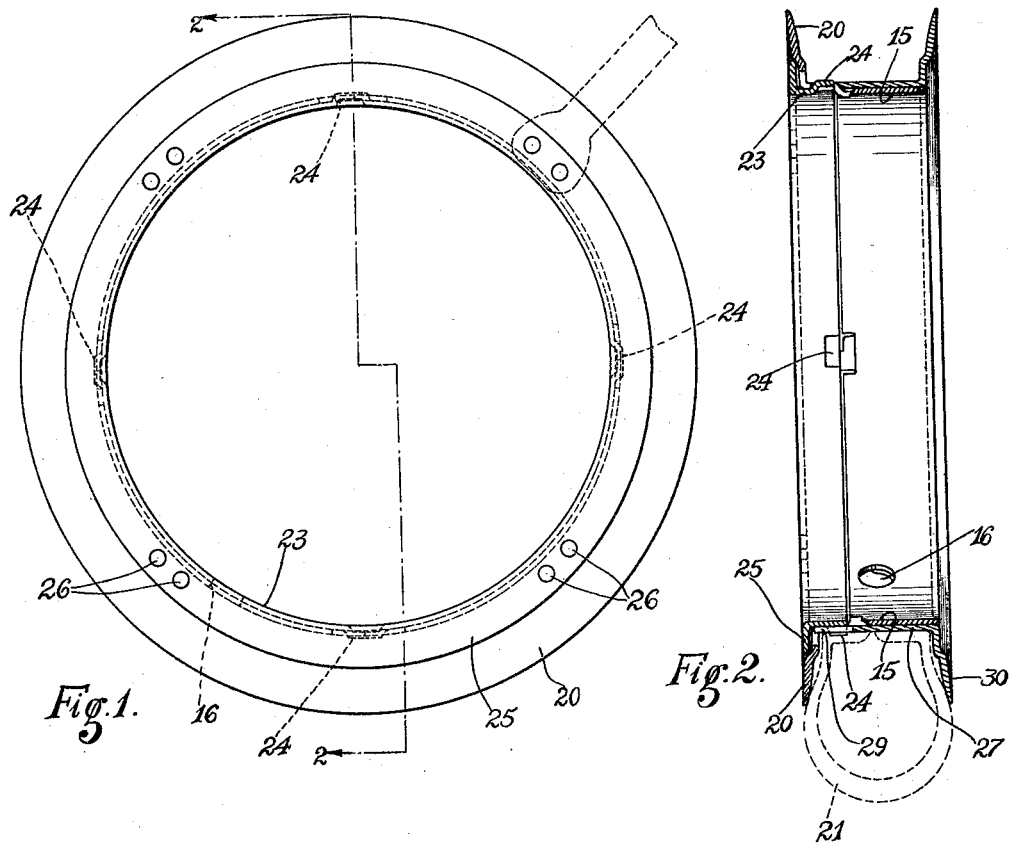
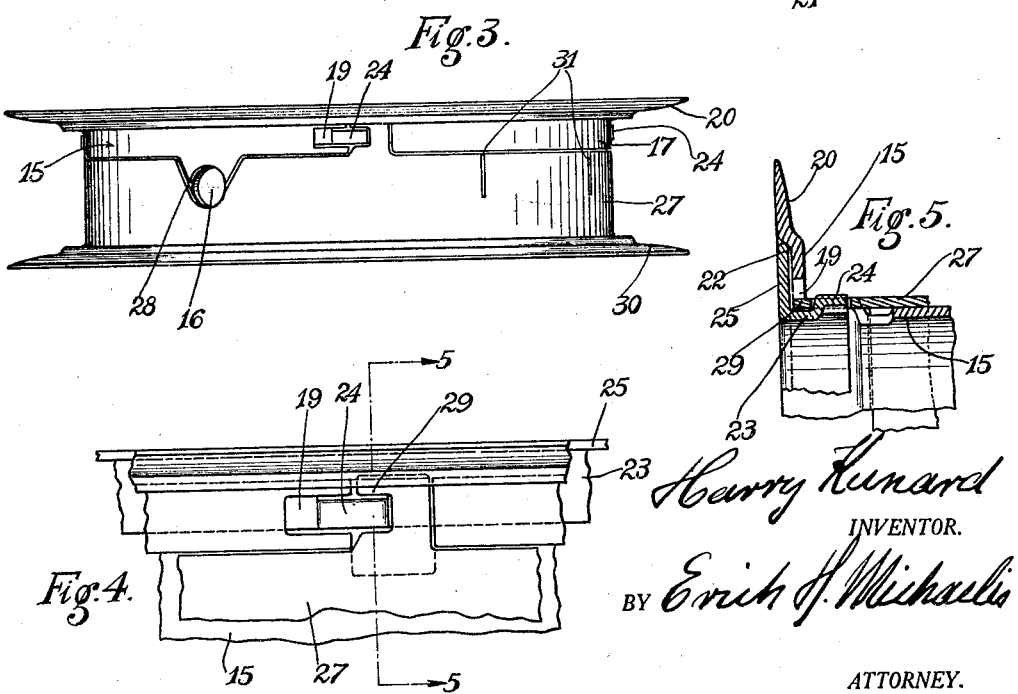
Harry Kunard
INVENTOR.
BY Erich J. Michaelis
ATTORNEY.

Dec. 13, 1932.                H. KUNARD                1,890,515
                               AUTO RIM
                      Filed May 27, 1932        2 Sheets-Sheet 2
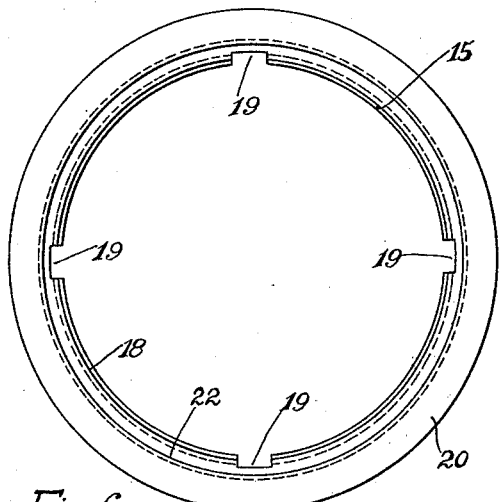
Fig. 6.
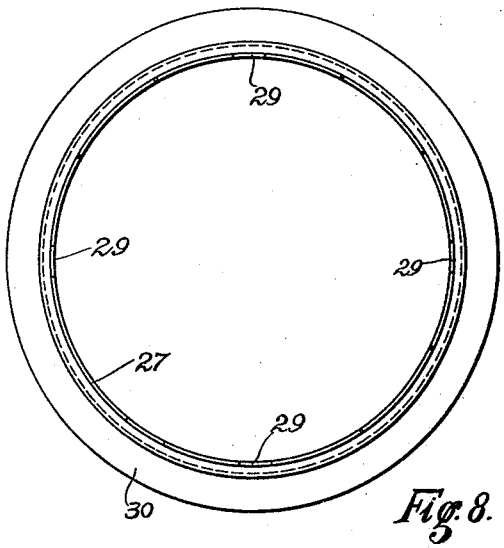
Fig. 8.
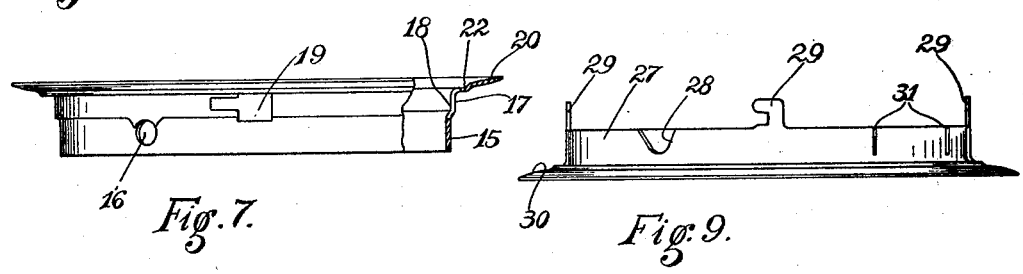
Fig. 7.         Fig. 9.
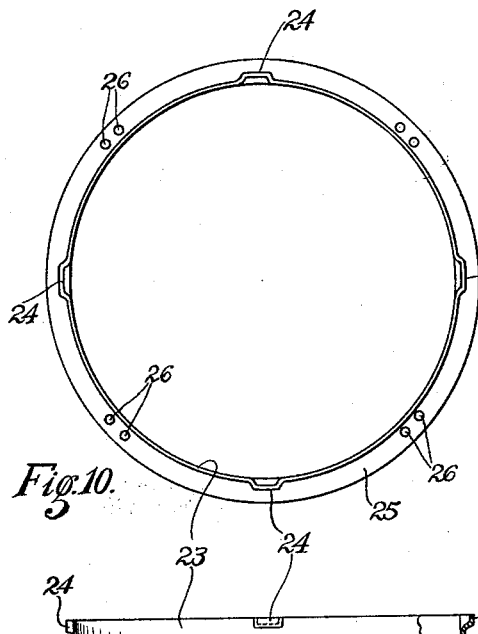
Fig. 10.
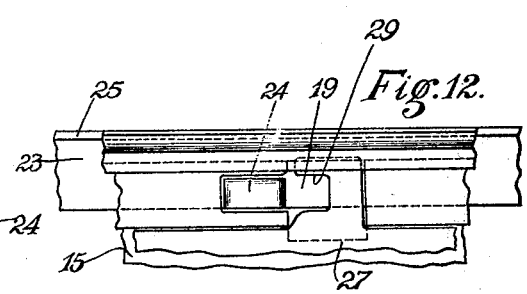
Fig. 12.
Fig. 13.
Fig. 14.
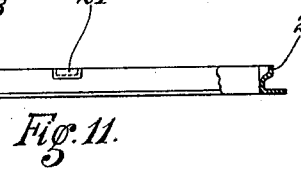
Fig. 11.
Harry Kunard
INVENTOR
BY Erich H. Michaelis
ATTORNEY Patented Dec. 13, 1932

1,890,515

UNITED STATES PATENT OFFICE

HARRY KUNARD, OF CHICAGO, ILLINOIS

AUTO RIM

Application filed May 27, 1932. Serial No. 613,920.

The invention relates to rims of vehicle wheels and more especially to such rims which are adapted to receive and hold so-called pneumatic tires.

The object of the invention is to provide a rim which may be used on a wheel having wooden spokes as well as on so-called disc wheels and wheels with wire spokes.

Another object of the invention is to provide a rim adapted to be dismounted to exchange pneumatic tires without the necessity of loosening or fastening any bolts or screws.

Other objects of the invention not specifically mentioned may be easily ascertained and understood from the following description in connection with the accompanying drawings forming a part thereof. It is however to be understood, that the invention is not to be limited or restricted to the exact construction and formation shown in the drawings and described in the specification, but that said invention is only to be limited by the scope of the claims appended hereto.

In the drawings illustrating a preferred embodiment of the invention:

Fig. 1 is a side view of an assembled rim according to the present invention, a wrench to be used in connection with said rim being indicated in dotted lines, Fig. 2 is a sectional view taken on line 2—2 of Fig. 1, a tire being indicated on said rim in dotted lines, Fig. 3 is a bottom view of Fig. 1, Fig. 4 is a detail view in an enlarged scale illustrating the locking device holding the different parts of the rim together, Fig. 5 is a sectional view taken on line 5—5 in Fig. 4, Fig. 6 is a plane view of the body of the rim according to the present invention, Fig. 7 is a bottom view of Fig. 6, Fig. 8 is a plane view of the holding ring forming a part of the rim according to the present invention, Fig. 9 is a bottom view of Fig. 8, Fig. 10 is a plane view of a locking ring used to secure the holding ring on the body of the rim according to the present invention, Fig. 11 is a bottom view of Fig. 10, Fig. 12 is a view similar to Fig. 4, but illustrating the locking means in open position, and Figs. 13 and 14 are two views illustrating a wrench used in connection with the rim according to the present invention.

The rim body consists of a ring 15 which may be fastened partly to the spokes or to the disc of the wheel. This ring is provided with a hole 16 for the purpose of receiving the valve of the inner tube (not shown). The portion 17 of the body ring which is supposed to be arranged adjacent the automobile body is of somewhat bigger diameter, as clearly shown in Fig. 7, forming with the other portion 15 a shoulder 18 indicated in Fig. 6. A plurality of keyhole slots 19 are provided in the bigger ring portion 17. From this portion a flange 20 extends radially outwardly and is adapted to engage the side of a tire 21 mounted on the rim. Adjacent its inner edge the flange 20 is provided with a circular depression forming a shoulder 22. The bigger part of the keyholes 19 extends far enough axially outwardly, to produce cutout portions in the ledge formed by the depression in the flange 20, as clearly shown in Fig. 6.

A locking ring 23 is provided with a plurality of radially outwardly extending lugs 24, and with a radially outwardly extending flange 25. This ring fits snugly into the larger body portion 17 so, that the lugs will enter the bigger part of the keyholes 19, and the flange 25 of the locking ring will fit into the depression in the flange 20 of the rim body. When the locking ring is in this position, the edge of the ring proper will rest on the shoulder 18 between the larger and the smaller portion of the body ring, and the flange 25 of the locking ring will rest on the bottom of the depression in the flange 20 of the body.

A plurality of pairs of holes 26 are provided in the flange 25 of the locking ring for a purpose to be described later on.

A holding ring 27 has the same diameter as the larger portion 17 of the rim body, so that the smaller portion 15 may slide into the holding ring 27, and the offset between the larger portion 17 and the smaller portion 15 may abut the holding ring 27. The holding ring is provided with a cutout 28 adapted to surround the valve of an inner tube (not shown) and has a plurality of hooks 29. These hooks extend into the bigger parts of the keyholes 19, when the holding ring is slipped over the smaller portion 15 of the body. The holding ring has a radially outwardly extending flange 30 shaped similar to the flange 20 of the body of the rim and also adapted to engage the side of the tire 21. The holding ring proper is provided with a plurality of axially extending slots 31 serving a purpose to be explained later on.

The rim according to the present invention operates as follows: The lock ring 23 is inserted into the bigger part of the body, as described above, and is given a part turn, so that the lugs 24 will be located in the narrow portion of the keyholes 19. To facilitate this operation a special wrench may be used consisting of a bar 32 having at one of its ends a pair of pins 33, as shown at Figs. 13 and 14. These pins are set so, that they will fit into any one of the pairs of holes 26 in the flange of the locking ring. When the locking ring is in the described position, the tire may be mounted on the body of the rim, and then the holding ring will be slipped between the tire and the smaller body portion 15 so, that the cutout portion 28 of the holding ring will fit around the valve of the tire (not shown), and the hooks 29 of the holding ring will extend into the bigger part of the keyholes 19. By means of the wrench 32, the locking ring is then given a partial rotary movement, so that the lugs 24 will then engage the hooks 29 of the holding ring, and the narrow part of the keyholes 19 in the body, thereby firmly and securely holding the body and the holding ring together. On account of the slots 31 in the holding ring 27 the pressure exerted by the tire on the holding ring will force said ring tighter against the small portion 15 of the body located inside the holding ring.

It is easy to see, that a tire may be mounted very quickly, and without any hard work whatsoever on a rim, according to the present invention especially since there are no screws, bolts or nuts to be loosened and tightened.

Having described my invention and how the same is to be performed I claim as new and desire to secure by Letters Patent:

1. In a device of the class described a body of a wheel rim having a radially outwardly extending circular flange and adapted to receive a rubber tire, the flange being adapted to engage the side of said tire, the body being provided with a plurality of circumferentially extending hoes, a locking ring rotatably mounted on said body, a plurality of radially outwardly extending lugs on the locking ring adapted to enter the holes on the body, and a holding ring having a plurality of hooks thereon adapted to enter the holes in the body, the lugs on the locking ring being adapted to engage upon rotation to engage said hooks while remaining in engagement with the holes in the rim.

2. In a device of the class described a body of a wheel rim adapted to be attached to a vehicle wheel, said rim having a radially outwardly extending circular flange and adapted to receive a pneumatic tire, the flange being adapted to engage the side of said tire, and having a depression therein forming a circular shoulder, the body being provided with a plurality of keyholes adjacent the flange of said rim the bigger portion of each keyhole extending into the recess in the flange, a locking ring rotatably mounted on the body, having a radially outwardly extending circular flange fitting into the recess in the flange of the body and a plurality of radially outwardly extending lugs adapted to enter the bigger part of the keyhole when the locking ring is put in position on the rim body, and adapted to enter the smaller part of the keyhole upon rotation, and a holding ring having a plurality of hooks thereon, said holding ring being adapted to be slid onto the body of the rim, said hooks extending into the bigger part of the keyholes, and the lugs on the locking ring being adapted to engage upon rotation the hooks while remaining in engagement with the smaller part of the keyholes in the rim.

In witness whereof I affix my signature.

HARRY KUNARD.